United States Patent [19]
Howell

[11] 4,001,646
[45] Jan. 4, 1977

[54] GROUND FAULT CIRCUIT INTERRUPTER UTILIZING A SINGLE TRANSFORMER

[75] Inventor: Edward Keith Howell, Simsbury, Conn.

[73] Assignee: General Electric Company, New York, N.Y.

[22] Filed: June 16, 1975

[21] Appl. No.: 586,864

[52] U.S. Cl. .............................. 317/18 D; 317/53
[51] Int. Cl.² .................................... H02H 3/26
[58] Field of Search .................. 317/18 D, 27 R, 53

[56] References Cited
UNITED STATES PATENTS

| | | | |
|---|---|---|---|
| 3,786,356 | 1/1974 | MacPhee | 317/18 D |
| 3,794,884 | 2/1974 | Sircom | 317/27 R X |
| 3,801,871 | 4/1974 | Loh | 317/18 D |
| 3,879,639 | 4/1975 | Sircom | 317/18 D |

Primary Examiner—Harry Moose
Attorney, Agent, or Firm—Robert A. Cahill; Walter C. Bernkopf; Frank L. Neuhauser

[57] ABSTRACT

A GFCI utilizes a single transformer in responding to ground faults on either of the line and neutral conductors of a distribution circuit. The transformer, a differential current transformer, has a secondary winding which is periodically strobed during a first sampling interval for the presence of a fault signal indicative of a line-ground fault. During a second sampling interval, a negative resistance network sets up a ringing oscillation in the transformer secondary circuit. If the neutral conductor is grounded through a low impedance ground fault, the oscillation is damped, and circuit interruption is initiated. Absent a low impedance ground fault on the neutral conductor, the oscillation amplitude increases to exceed a predetermined threshold level during the second sampling interval, and circuit interruption is not initiated.

19 Claims, 7 Drawing Figures

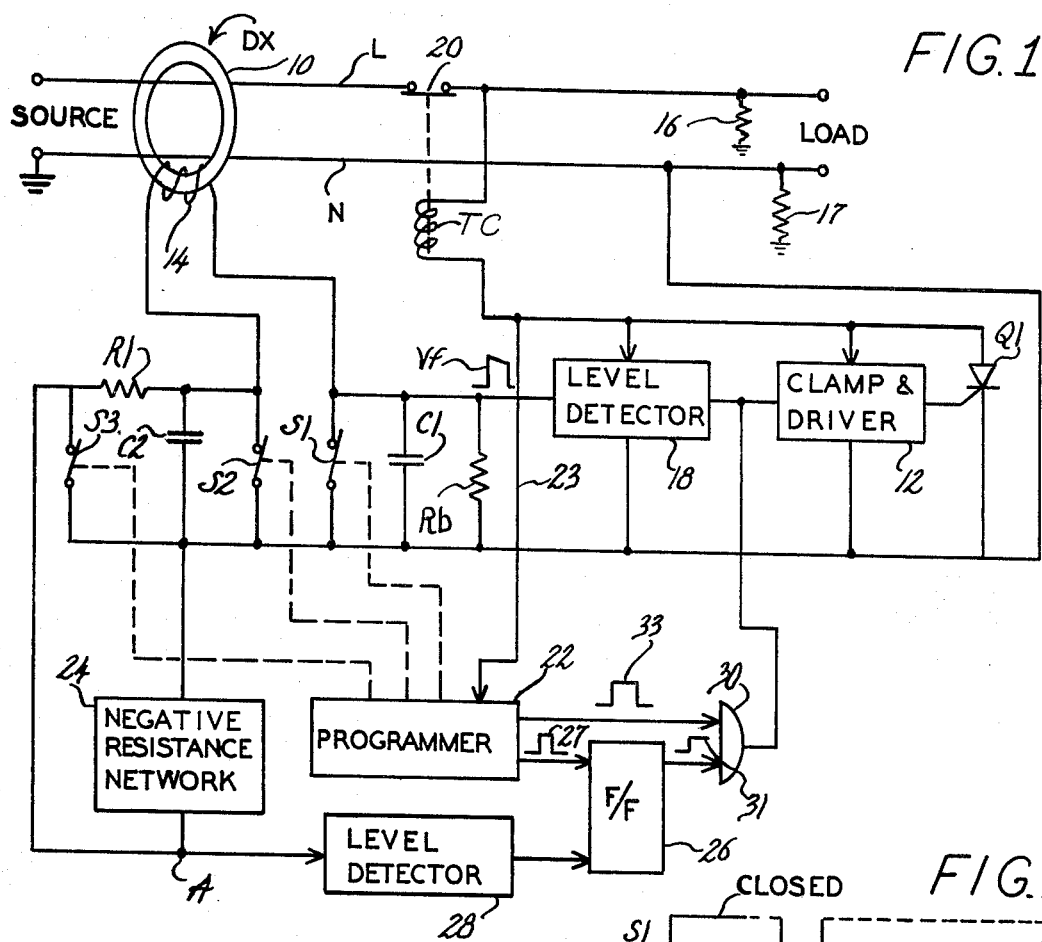

GROUND FAULT CIRCUIT INTERRUPTER UTILIZING A SINGLE TRANSFORMER

BACKGROUND OF THE INVENTION

Ground fault circuit interrupting (GFCI) devices traditionally utilize a differential current transformer to sense current imbalances in the line and neutral conductors of a power distribution circuit, as occasioned by ground leakage current from the line conductor returning to the source through an unintended ground circuit path other than the neutral conductor. To prevent injurious electrical shock, the differential current transformer must develop a signal voltage of sufficient magnitude to enable a signal processor to initiate circuit interruption when the current differential in the line and neutral conductors is as low as 5 milliamps. A problem arises in sensing the true magnitude of this ground leakage current if the neutral conductor is subjected to a low impedance ground fault adjacent the load. Since the neutral conductor is also grounded at the source in conventional wiring installations, such double grounding of the neutral conductor could create a situation where a portion of this ground leakage current returns to the source through the neutral conductors. As a consequence, the current differential showing up in the differential current transformer would not be truly indicative of the magnitude of the ground leakage current. Thus, a sufficiently low impedance neutral to ground fault has the potential of desensitizing the differential current sensor such that the GFCI device would trip only in response to considerably higher ground leakage current levels. It is for this reason that Underwriters Laboratories requires that GFCI devices have the capability of interrupting the circuit in the event of a desensitizing ground fault on the neutral conductor.

The conventional approach toward coping with such desensitizing neutral-ground faults is to utilize a second, so-called neutral transformer having a secondary winding connected in series with the neutral side of the distribution circuit. If the neutral conductor experiences a low impedance ground fault, it becomes a closed loop secondary winding, and driving of the neutral transformer primary will produce a current flow in this secondary loop. If the neutral ground fault impedance is sufficiently low as to have a significant desensitizing effect on the response of the GFCI to ground leakage current, the current induced in this secondary loop is of sufficient magnitude to create the requisite current imbalance in the differential transformer for initiating a trip function.

The addition of this second transformer adds significantly to the complexity and cost of GFCI design, and also takes up valuable space which is at a premium when faced with the task of packaging a GFCI module in circuit breakers and outlet receptacles capable of being installed in existing enclosures.

It is accordingly an object of the present invention to provide an improved ground fault circuit interrupting device capable of responding to both high impedance ground faults on the line conductor and low impedance ground faults on the neutral conductor of a conventional electrical power distribution circuit.

An additional object is to provide a ground fault circuit interrupting device of the above character which is capable of responding to desensitizing ground faults on the neutral conductor without requiring a neutral transformer.

An additional object of the present invention is to provide a ground fault circuit interrupting device of the above character which is compact, simple in design, and inexpensive to manufacture.

Other objects of the invention will in part be obvious and in part appear hereinafter.

SUMMARY OF THE INVENTION

In accordance with the present invention, there is provided an improved ground fault circuit interrupting device having the capability of detecting ground faults on the line and neutral conductors of a power distribution circuit and for interrupting this circuit should these ground faults be of a hazardous character. More specifically, the present invention utilizes a differential current sensor of the type disclosed and claimed in my co-pending application, Ser. No. 571,930, which is a continuation-in-part of application Ser. No. 509,462, filed Sept. 26, 1974. The disclosure of this application is specifically incorporated herein by reference.

Thus, the current sensor is in the form of a differential current transformer comprising a toroidal core having a pair of preferably single-turn primary windings which are respectively connected in the line and neutral sides of the distribution circuit for which ground fault protection is sought. The multi-turn secondary winding is shorted on itself through an electronic switch connected in parallel with a burden resistor of a relatively high resistance value. Any secondary current flow occasioned by the existence of a current differential in the primary windings is normally shunted from the burden resistor through the electronic switch. Periodically, preferably approximate the peaks of alternate half-cycles of the line voltage, the electronic switch is opened to divert the secondary current through the burden resistor, thereby developing a momentary, relatively high amplitude signal voltage thereacross for application to signal processing circuitry pursuant to initiating a trip function if the signal voltage amplitude exceeds a predetermined threshold level. A sampling of the transformer secondary circuit through opening of the electronic switch is under the control of a programmer synchronized to the line frequency.

At the conclusion of this very brief sampling period, the programmer recloses the electronic switch and subsequently opens a second electronic switch to connect the transformer secondary in circuit with a negative resistance network for a second sampling period. This negative resistance network includes a source of DC current for shock exciting a tank circuit which includes the reflected resistance of any fault connecting the neutral conductor to ground. In the absence of a desensitizing ground fault on the neutral conductor, the amplitude of the ringing oscillation established in this tank circuit will increase over this second sampling period, by virtue of the effective negative resistance presented to the tank circuit by the negative resistance network. On the other hand, if the neutral conductor is subjected to a desensitizing ground fault, the ringing oscillation in this tank circuit will be severely damped by the end of this second sampling period. A level detector, under the control of the programmer monitors the amplitude of the oscillation and initiates a trip function if the amplitude of the oscillation did not exceed a predetermined threshold level during the second sampling period. The negative resistance network thus affords, by virtue of whether the ringing oscillation in the tank circuit is regenerative or degenerative, a sensor of rather high resolution capable of reliably sensing desensitizing ground faults on the neutral conductor.

The invention accordingly comprises the features of construction, combinations of elements, and arrangements of parts which will be exemplified in the constructions hereinafter set forth, and the scope of the invention will be indicated in the claims. For a fuller understanding of the nature and objects of the invention, reference should be had to the following detailed description taken in conjunction with the accompanying drawings, in which:

FIG. 1 is a schematic diagram of a ground fault circuit interrupting (GFCI) device embodying the present invention;

FIG. 2 is a timing diagram useful in understanding the operation of the GFCI device of FIG. 1;

DETAILED DESCRIPTION

Figure 3:
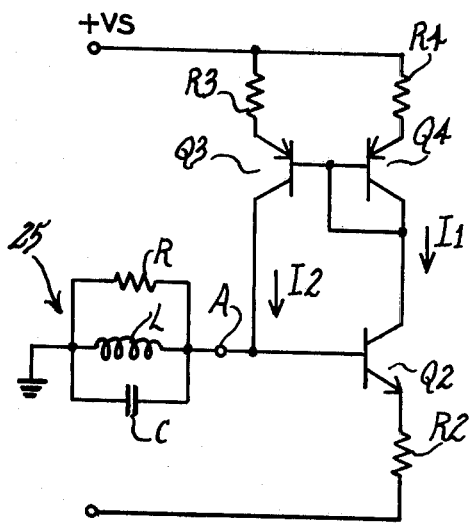
FIG. 3 is a detailed circuit schematic diagram of a negative resistance network usable in the GFCI device of FIG. 1.

The ground fault circuit interrupting (GFCI) device of the present invention includes, as seen in FIG. 1, a single transformer, specifically a differential current transformer DX, having a toroidal core 10 through which the line conductor and neutral conductor L and N, respectively, of a power distribution circuit pass as preferably single-turn primary windings, although multi-turn windings were contemplated. The neutral conductor is grounded at the source, as is conventional practice. The series combination of a trip coil TC and a thyristor Q1 is connected across the line and neutral conductors. The thyristor is normally maintained in its non-conductive state by a clamp and drive network 12 connected to the thyristor gate. A multi-turn secondary winding 14 wound on core 10 is selectively connected to develop a fault signal voltage across a burden resistor Rb proportional in amplitude to any imbalance in the currents flowing in the line and neutral conductors occasioned by ground leakage current flowing through a line to ground fault, indicated at 16. If this fault signal voltage exceeds a predetermined magnitude, as determined by a level detection network 18, the clamp and driver network 12 is conditioned to fire the thyristor Q1, completing a low impedance energization circuit for the trip coil TC. Actuation of the trip coil causes contacts 20, included in the line conductor, to open and thereby interrupt the distribution circuit.

Secondary winding 14 of differential transformer DX is normally operated in a short circuited mode with its two sides shorted together through switches S1 and S2. Consequently, any secondary current occasioned by an imbalance in the currents flowing in the line and neutral conductors is shunted from the burden resistor Rb.

A programmer 22, synchronized to the line frequency over lead 23, periodically, momentarily opens switch S1, such as to divert any secondary current through burden resistor Rb, pursuant to developing a fault signal voltage pulse $V_f$ for application to level detection network 18. Capacitor C1, connected across the burden resistor, is used for high frequency suppression of unwanted transient signals which may occur while switch S1 is open. Referring to the timing diagram of FIG. 2, switches S1 and S2 are closed at time $t0$, which coincides with the beginning of alternate half-cycles of the sinusoidal line voltage, for example, the zero-crossing of each positive half-cycle. At time $t1$, for example, 3.2 milliseconds into the positive half-cycle, programmer 22 opens switch S1 and, at time $t2$, recloses this switch to define a first sampling period during which the distribution circuit is interrogated for the presence of a line-ground fault 16. The duration of this sampling period from time $t1$ to $t2$ may be on the order of 50 microseconds As was disclosed in my co-pending application, Ser. No. 571,930 which is a continuation-in-part of application Ser. No. 509,462, this approach of normally operating the differential transformer secondary winding in a short circuit mode through a switch and periodically opening the switch to momentarily divert secondary current flow through a large burden resistance is effective to develop thereacross a trip signal voltage of dramatically increased amplitude. With a larger signal voltage to work with, the task of handling this signal by signal processing means (level detection network 18 and clamp and driver network 12 herein) is achieved more simply and reliably. In addition, as was pointed out in my co-pending application, the larger fault signal voltages are achieved with significant cost improvements in the differential transformer construction.

Connected in parallel with switch S2 is a capacitor and, with a switch S3 closed under the control of programmer 22, a resistor R1. As seen in the timing diagram of FIG. 2, at time T2 switch S1 closes and switch S2 opens. The winding 14 of differential transformer DX is thus connected in parallel with capacitor C2 and resistor R1, and any oscillations in this LC network are critically damped during the interval $t2-t3$. At time t3, which may be on the order of 100 microseconds later, programmer 22 opens switch S3, leaving switch S2 open and switch S1 closed. It is thus seen that a negative resistance network 24 is now connected into a tank circuit consisting of capacitor C2, winding 14, the reflected impedance of the distribution circuit, and resistor R1. The negative resistance network includes means for shock exciting this tank circuit to set up a ringing oscillation therein. If the neutral conductor N is not subjected to a desensitizing ground fault, the negative resistance network 24 causes the amplitude of the ringing oscillation of the tank circuit to progressively increase in amplitude, as seen at Va in FIG. 2.

At some time during the interval $t2-t3$, programmer 22 issues a pulse 27 to set a flip-flop 26. A level detector 28 monitors the amplitude of the ringing oscillation in the tank circuit. If, during this second sampling period from time $t3$ to time $t4$, the ringing oscillation $V_a$ in the tank circuit builds up in amplitude to exceed a predetermined threshold level (indicated at 29 in FIG. 2) established by detector 28, the level detector issues an output (indicated at 31 in FIG. 2) to reset flip-flop 26, thereby removing an enabling input from an AND gate 30. At time $t4$ concluding this second sampling period, programmer 22 applies an output pulse (indicated at 33 in FIG. 2) to the other input of gate 30. However, since gate is now disabled by flip-flop 26, no fault signal issues to the clamp and driver network 26 for triggering thyristor Q1. On the other hand, if a ringing oscillation $V_a$ (FIG. 2) in the tank circuit is damped by the presence of a desensitizing ground fault 17 on neutral conductor N, its amplitude does not exceed the threshold level 29 established by level detector 28 by the conclusion of this second sampling period, and flip-flop 26 is not reset. AND gate 30 thus remains enabled at time $t4$, and the programmer output 33 passes through the gate as a fault signal activating the clamp and driver network 18 pursuant to initiating a trip function.

At time $t4$, programmer 22 closes switches S2 and S2 (switch S1 having previously closed at time $t2$), and at time $t5$, coincident with the end of each positive half-cycle of the line voltage, opens all of the switches to await the beginning of the next positive half-cycle. It will be appreciated that the diagrammatic showing of switches S1, S2 and S3 is purely illustrative and, in practice, the switches are implemented as electronic switches electrically controlled by programmer 22.

The negative resistance network 24 of FIG. 1 in its most basic form may be constructed in the manner illustrated in FIG. 3. Terminal A represents the point of electrical connection of the negative resistance network 24 to a tank circuit 25 consisting of a lumped resistance R, inductance L and capacitance C. Capacitance C represents capacitor C2 and any distributed capacitance of the distribution circuit reflected into this tank circuit through differential transformer DX. Inductance L includes the inductance of winding 14 and any reflected inductance. Resistance R includes resistor R1 and the reflected resistance of any ground fault 17 on neutral conductor N. Terminal A, as seen in FIG. 3, is connected through the base-emitter junction of a transistor Q2 and a resistor R2 to a negative supply voltage $-V_s$. Terminal A is also connected through the collector-emitter circuit of a transistor Q3 and a resistor R3 to a positive supply voltage $+V_s$. The mid-point between the positive and negative supply voltages is ground. The positive supply voltage bus is connected to the collector of transistor Q2 through the emitter-collector circuit of a transistor Q4 and a resistor R4. The bases of transistors Q3 and Q4 are connected together with a common connection to the collector of transistor Q4. With transistors Q3 and Q4 identical and resistor R3 equal to resistor R4, this network constitutes a current mirror with collector currents I1 and I2 being at all times equal.

The operation of the negative resistance network 24 of FIG. 3 is basically as follows. Ignoring the base-emitter voltage of transistor Q2, the voltage across resistor R2 (I1×R2) is equal to the supply voltage $V_s$ plus the voltage $V_a$ at terminal A. Thus, current I1 is equal to $V_s/R2$ plus $V_a/R2$, and, by virtue of the current mirror (transistors Q3 and Q4), current I1 is equal to current I2. Current I2 flows into terminal A, causing the negative resistance network to appear as a current source to tank circuit 25. Current I2 has a constant component determined by $V_s/R2$ and a variable determined by $V_a/R2$. The constant or DC current component of I2 is available to shock excite the tank circuit 25 and initiate the ringing oscillation at time $t3$ when switch S3 is opened by programmer 22. From FIG. 1 it is seen that while S3 is closed, terminal A is grounded. The variable or AC current component of I2 causes terminal A to appear as a negative resistance to the tank circuit equal to the resistance of resistor R2 which is effectively in parallel with the tank circuit resistance R.

Figure 6:
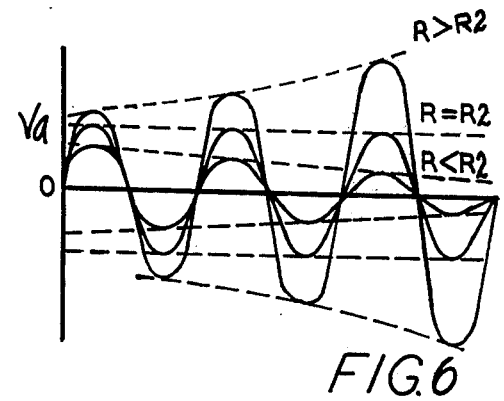
FIG. 6 is a signal diagram illustrating the various signal waveforms developed in response to different resistance values of a neutral ground fault.
Figure 7:
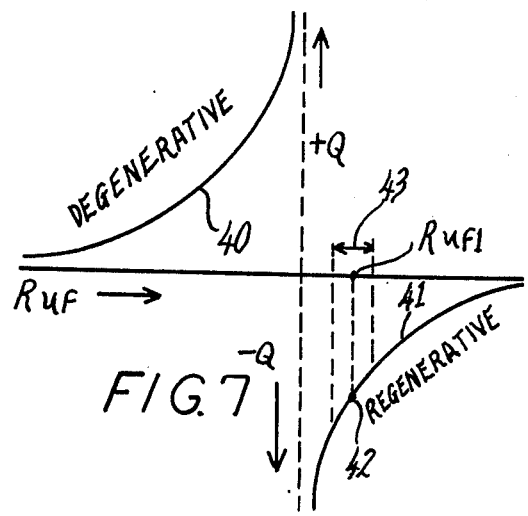
FIG. 7 is a plot of the Q of the tank circuit of FIGS. 3 through 5 versus the resistance of a neutral ground fault.

Upon opening switch S3, current I2 flows from terminal A into the tank circuit, shock exciting the circuit to produce a ringing oscillation therein. This raises the voltage $V_a$ at terminal A which causes a corresponding increase in the voltage at the emitter of transistor A2. Current I1 thus increases, as does current I2, by virtue of the current mirror (transistors Q3 and Q4). Consequently, additional current (AC component) is pumped into the tank circuit 25. If the resistance R is equal to the effective negative resistance established by resistor R2, these two resistances cancel, leaving a pure LC resonant tank circuit of infinite Q (FIG. 7) which will sustain the ringing oscillation without loss of amplitude through the sampling period $t3-t4$ (see FIG. 6). Under this condition, the current I2 makes up for losses in the resistance R of the tank circuit 25. If the resistance R is greater than the resistance of resistor R2, the voltage $V_a$ progressively increases, as do the currents I1 and I2. In this situation the tank circuit has a negative Q (FIG. 7), and the ringing oscillation therein increases in amplitude in regenerative fashion (FIG. 6) over the sampling period $t3-t4$. For the case where the resistance R is less than the resistance of resistor R2, current I2 cannot make up for losses in the tank circuit imposed by the resistance R, and the ringing oscillation is damped (degenerative) such that its amplitude decreases over the sampling period $t3-t4$, as seen in FIG. 6. In this case, the tank circuit has a positive Q, as seen in FIG. 7.

It is thus seen that for given resistance of resistor R2, the criteria for sustained oscillation of tank circuit 26 is its resistance R. The negative resistance network of FIG. 3, by its regenerative or degenerative action, thus functions as a threshold detector of the magnitude of the resistance R. In its resistance threshold detection role in the GFCI device of FIG. 1, resistance R, by transformer action, includes the reflected resistance value of any ground fault 17 serving to connect the neutral side of the distribution circuit in a closed loop. By proper selection of the resistance of resistor R2, the effective inductance L and capacitance C of the tank circuit, and the turns-ratio of the differential transformer DX, the negative resistance network can be utilized to detect resistance values over a very large range, with electrical isolation between the detector circuit and the variable resistance. The sensitivity of the detector to changes in resistance R improves as the ratio of the resistance of resistor R2 to the characteristic impedance of the tank circuit (square root of L/C) is reduced. This ratio establishes the shape of the hyperbolic curves 40, 41 of FIG. 7 plotting the Q of tank circuit 25 as a function of the neutral ground fault resistance Rnf. A ratio of 5:1 has been found adequate for sensing neutral ground faults in a GFCI application. Having established an optimum shape or eccentricity for curves 41, 42, sensitivity is further enhanced by establishing a fault resistance trip threshold level Rnfl corresponding to a point on one of the curves 40, 41, for example point 42 on curve 41, where the negative resistance network establishes a relatively high rate of change of Q for small variations of fault resistance about the fault resistance threshold level. Thus, variations of fault resistance within a range 43 about the threshold level Rnfl produces marked changes in the degree of regeneration of the ringing oscillation over the sampling period $t3-t4$. The trip resolution capability of the level detector 28 (FIG. 1) is thus materially enhanced.

Current standards require that GFCI devices trip in the presence of a ground fault on the neutral conductor having a resistance of 4 ohms or less. In practice, it is deemed desirable to eatablish a somewhat higher fault resistance as the dividing line between regenerative and degenerative action of the tank circuit 25. Thus, the threshold resistance level established by level detector 28 (FIG. 1) may be established at a fault resistance value Rnfl of, for example, 10 ohms. Thus, if the fault resistance is less than 10 ohms, but more than, for example, 6 ohms, regenerative action ensues. However, the amplitude of the ringing oscillation in tank circuit 25, though regenerative, does not build up to the threshold level 29 (FIG. 2) established by level detector 28 by the end of the sampling interval $t3-t4$. Consequently, flip-flop 26 is not reset by the end of this sampling period, and the programmer output issuing at time $t4$ is passed through gate 30 to trigger the clamp and driver circuit 12 pursuant to initiating a trip function. If the fault resistance 17 is less than 6 ohms, degenerative action ensues, and the amplitude of the ringing oscillation in tank circuit 25 at time $t4$ will be well below the threshold level 29. Again a trip function is initiated.

If the resistance of ground fault 17 is greater than 10 ohms, the amplitude of the ringing oscillation in tank circuit 25 will increase over the sampling period $t3-t4$ to a level exceeding the threshold level 29, whereupon flip-flop 26 will be reset prior to time $t4$. AND gate 30 is thus blocked and no trip function is initiated. In the absence of a ground fault 17 on the neutral conductor, the reflected resistance R is very large and the amplitude of the ringing oscillation in the tank circuit will rapidly build up to an amplitude limited only by saturation of transistor Q2. This is well above the threshold level 29 established by level detector 28, and, consequently, flip-flop 26 is reset early in the sampling period $t3-t4$ to disable gate 30.

While it is preferred to establish the threshold resistance Rnfl in the regenerative region, it will be appreciated by those skilled in the art that the benefit afforded by the negative resistance network of providing increased rate of change of the Q of tank circuit 25 for small changes in fault resistance can also be achieved by establishing the threshold resistance in the degenerative region. In this case, the level detector 28 should be gated such that it will monitor the ringing oscillation amplitude only during the latter part of the sampling period $t3-t4$.

Figure 4:
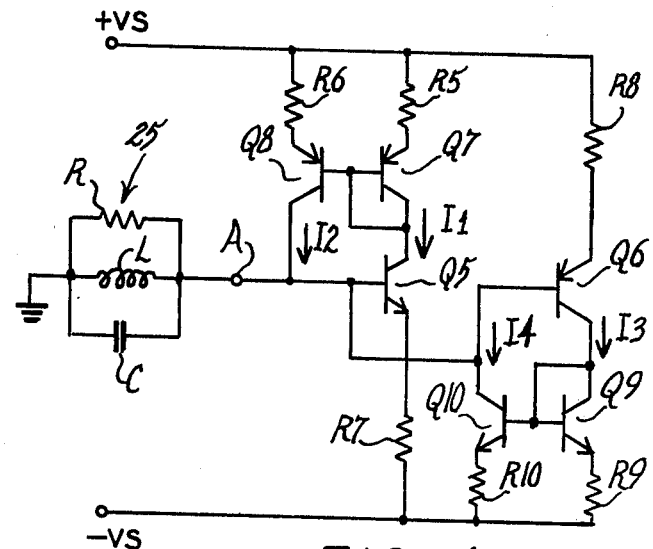
FIG. 4 is a detailed circuit schematic diagram of an alternative negative resistance network usable in the GFCI device of FIG. 1.

The negative resistance network of FIG. 4 is analagous to the network of FIG. 3, except that it utilizes a complementary current source. As a consequence, this embodiment does not include provisions for shock exciting tank circuit 25. It will be understood that the requisite shock excitation of the tank circuit can be effected via an auxiliary source effective upon opening of switch S3 (FIG. 1), to, for example, drive an auxiliary winding (not shown) about toroidal core 10. Conceivably, there may be sufficient energy induced in tank circuit 25 upon opening of switch S3 to provide the requisite shock excitation.

Referring specifically to FIG. 4, terminal A is connected in common to the bases of transistors Q5 and Q6. The collector of transistor Q5 is connected through the collector-emitter circuit of a transistor Q7 and a resistor R5 to the positive supply voltage $+V_s$. Terminal A is connected through the collector-emitter circuit of a transistor Q8 and a resistor R6 to the plus supply voltage $+V_s$. Transistors Q7 and Q8 are interconnected such to function as a current mirror. The emitter of transistor Q5 is connected to the negative supply voltage $-V_s$ through a resistor R7. The emitter of transistor Q6 is connected through a resistor R8 to the plus supply voltage, while its collector is connected through the collector-emitter circuit of a transistor Q9 and a resistor R9 to the negative supply voltage. Transistors Q9 and Q10 are interconnected to provide a second current mirror complementing the other current mirror, transistors Q7 and Q8.

With the voltage at terminal A zero, and resistors R7 and R8 equal, the current I2 flowing to terminal A through transistor Q8 equals the current I4 flowing away from terminal A through transistor Q10. Similarly, current I1 flowing through transistor Q5 and current I3 flowing through transistor Q6 are equal. By virtue of the current mirrors, current I2 is also equal to current I1 and current I4 is equal to current I3. Consequently, the current flowing out from terminal A to the tank circuit 25 is zero, and there is no DC component of the current I2 available to shock excite the tank circuit 25. Assuming the tank circuit is shock excited by auxiliary means, as the voltage $V_a$ at terminal A goes positive, the currents I1 and I2 increase by the ratio $V_a/R7$. It is thus seen that the resistance of resistor R7 determines the effective resistance presented to the tank circuit 25 by the network Q5, Q7 and Q8 of FIG. 4. It will be noted, however, that as the voltage $V_a$ at terminal A goes positive, the conductance of transistor Q6 is decreased causing a corresponding reduction in the magnitude of current I4. The reduction in current I4 is equal to the increase in the current I1. There is consequently provided a push-pull effect, in that the current flowing from terminal A available for regenerative oscillation of the tank circuit 26 in equal to twice the voltage at terminal A divided by resistance R7. The network of FIG. 4 thus appears to have a negative resistance of one-half the resistance of resistor R7 to AC signal voltages $V_a$ at terminal A. A particular advantage of the negative resistance network of FIG. 4 is that the effects of variations in the supply voltage $V_s$ cancel out at input terminal A.

Figure 5:
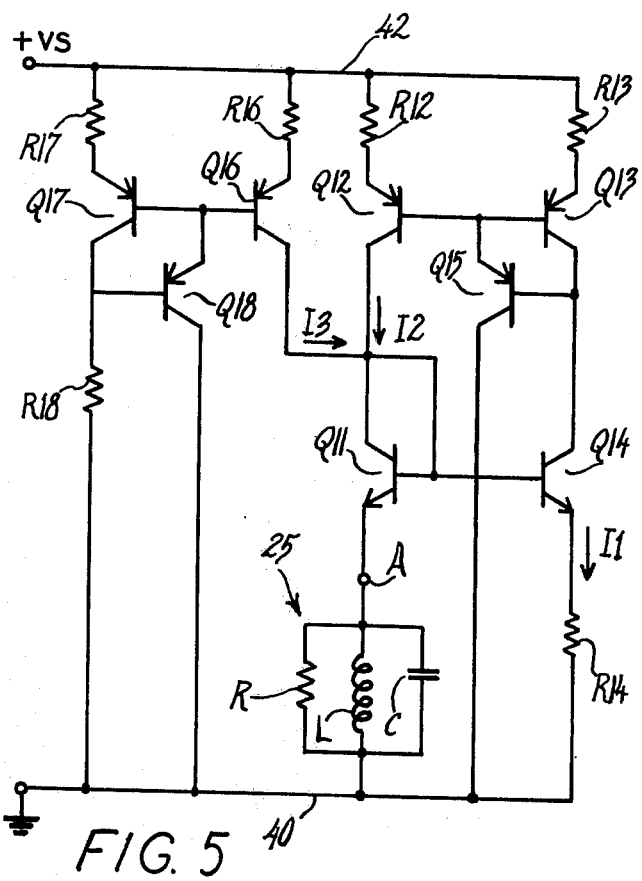
FIG. 5 is a detailed circuit schematic diagram of still another embodiment of a negative resistance network usable in FIG. 1.

The negative resistance network of FIG. 5 is considered to be the preferred construction for utilization in the GFCI device of FIG. 1 because of its ability to operate from a single-ended positive power supply and to handle low amplitude AC signal voltages Va. In this embodiment, tank circuit 25 is connected between the terminal A and a ground bus 40. Terminal A is connected through the emitter-collector circuit of a diode-connected transistor Q11, the collector-emitter circuit of transistor Q12, and a resistor R12 to a positive supply voltage bus 42. Transistor Q13, which cooperates with transistor Q12 to provide a current mirror, has its emitter connected to bus 42 through resistor R13 and its collector connected to ground bus 40 through the collector-emitter circuit of a transistor Q14 and a resistor R14. The bases of transistors Q12 and Q13 are connected in common and through the emitter-collector circuit of a transistor Q15 to ground bus 40. The base of transistor Q15 is connected to the collector of transistor Q13. The bases of transistors Q11 and Q14 are connected together and to the collector of transistor Q11. The collector of transistor Q11 is connected to the collector-emitter circuit of a transistor Q16 and a resistor R16 to the positive voltage supply bus 42. Bus 42 is connected to bus 40 through a resistor R17, the emitter-collector circuit of a transistor Q17, and a resistor R18. The bases of transistors Q16 and Q17 are connected together and through the emitter-collector circuit of a transistor Q18 to ground bus 40. The base of transistor Q18 is connected to the collector of transistor Q17. It is seen that transistors Q16 and Q17 are thus connected in current mirror fashion.

The voltage applied to the base of transistor Q14 is offset from the voltage Va at terminal A by the base-emitter voltage of transistor Q11, which is identical to transistor Q14. The current mirror of transistors Q16, Q17 and Q18 form an independent source of DC current I3 which is applied through transistor Q11 to terminal A for shock exciting the tank circuit 25. The magnitude of the current I3 is established by the resistance of resistor R18 and has no dependence on the value of resistor R14. When the voltage at terminal A is zero, the current I3 produces a voltage drop across transistor Q11 which is applied to the base of transistor Q14, causing a small current flow I1 through resistor R14 and, by virtue of the current mirror (transistors Q12 and Q13) and equal current I2 flowing through transistor Q11 to terminal A.

Upon opening of switch S3 (FIG. 1) and when the voltage at terminal A rises positively, current I1 increases as does current I2. Current I2 flows through transistor Q11 to produce regenerative or degenerative operation of tank circuit 25, depending upon the relationship of the resistance R to the effective negative resistance afforded by resistor R14. With small signal voltages at terminal A, the voltage gain of transistor Q14 is less than unity, and thus changes in signal voltages do not produce corresponding changes in current I1. Consequently, the negative resistance appearing at terminal A is larger in magnitude than the resistance of resistor R14. As the current I3 is reduced to a level comparable with or less than the current I2, the voltage gain improves, approaching unity, and the negative resistance at terminal A decreases toward the resistance value of resistor R14. A voltage gain of approximately 0.5 has been found suitable for GFCI applications.

It will be noted that the GFCU device of FIG. 1 possesses inherent fail-safe features. Should a component failure prevent the establishment of a ringing oscillation in the tank circuit 25, a trip function will be initiated as though a desensitizing ground fault 17 existed on the neutral conductor N. A discontinuity of breakage in the secondary winding 14 will result in the voltage Va rising toward the positive supply voltage as the capacitor C2 is charged by the current I2. If the level detector 28 is designed to establish a negative voltage threshold 29a (FIG. 2) which must be exceeded to inhibit tripping. A high positive voltage existing at terminal A upon expiration of the second sampling period will likewise cause a trip function to be initiated.

The negative resistance networks of FIGS. 3 through 5 are seen to have a variety of other applications where resistance threshold detection is desired. Thus, these networks can be utilized in conjunction with a variety of sensors whose resistance varies with the condition (light, temperature, strain, position, etc.) being monitored. Moreover, the negative resistance networks of FIGS. 3 through 5 are also useful as Q-multipliers, regenerative amplifiers, and oscillators. Regardless of specific application, the disclosed negative resistance networks have the attributes of adjustability, stability, independence from normal variations in active device characteristics and simplicity. Moreover, these networks are highly suitable to monolithic integrated circuit implementation.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A ground fault circuit interrupting device for monitoring an electrical distribution circuit including a line conductor and a neutral conductor grounded at the source and interrupting the circuit in the event of a ground fault on the line conductor resulting in a ground fault current exceeding a predetermined current value and a ground fault on the neutral conductor of a resistance below a predetermined resistance value, said device comprising, in combination:
   A. a differential current transformer having
      1. a first winding for connection in series with the line conductor,
      2. a second winding for connection in series with the neutral conductor,
      3. a third winding in which is developed a fault signal proportional in amplitude to the ground fault current occasioned by a ground fault on the line conductor;
   B. first means monitoring the amplitude of said fault signal and initiating circuit interruption when said fault signal amplitude exceeds a first predetermined threshold level correlated to said predetermined current value;
   C. second means connected with said third winding to form therewith a tank circuit, the resistive impedance of a neutral ground fault being reflected into said tank circuit via said second winding;
   D. a negative resistance network connected to shock excite said tank circuit and develop therein a ringing oscillation, said negative resistance network operative to increase the rate of change of the Q of said tank circuit for variations in neutral ground fault resistance about said predetermined resistance value and to establish a negative Q in said tank circuit for a neutral ground fault resistance equalling said predetermined resistance value, whereby the operation of said tank circuit is regenerative for neutral ground fault resistances equal to and greater than said predetermined resistance value; and
   E. third means monitoring the amplitude of said ringing oscillation during a prescribed time period succeeding shock excitation of said tank circuit to detect a neutral ground fault having resistance below said predetermined resistance level, whereupon to initiate circuit interruption.

2. The device defined in claim 1, wherein said third means initiates circuit interruption in the event the amplitude of said ringing oscillation fails to exceed a second predetermined threshold level within said prescribed time period.

3. The device defined in claim 2, which further includes a programmer controlling said first and third means to repetitively monitor said fault signal amplitude during a first sampling period and to monitor the amplitude of said ringing oscillation during a second sampling period.

4. The device defined in claim 3, wherein said third means includes:
   1. a gate connected to pass a trip signal issued by said programmer at the conclusion of said second sampling period to initiate circuit interruption,
   2. a flip-flop conditioned by said programmer prior to said sampling period to enable said gate, and
   3. a threshold detector monitoring the amplitude of said ringing oscillation in said tank circuit and conditioning said flip-flop to disable said gate should the oscillation amplitude exceed said second predetermined threshold at any time during said second sampling period.

5. The device defined in claim 4, wherein said first means includes
   1. a burden resistor connected across said third transformer winding,
   2. a level detector monitoring the voltage of said fault signal as developed across said burden resistor, and
   3. a first switch connected in shunt with said burden resistor, said switch being normally closed to shunt current from said burden resistor,
   4. said programmer operating to open said switch during said first sampling period and divert current through said burden resistor to develop thereacross said fault signal voltage.

6. A ground fault circuit interrupting device for monitoring an electrical distribution circuit including a line conductor and a neutral conductor grounded at the source and selectively interrupting the circuit in the event of a ground fault on either conductor, said device comprising, in combination:
   A. a differential current transformer having
      1. a first winding for connection in series with the line conductor,
      2. a second winding for connection in series with the neutral conductor, and
      3. a third winding;
   B. first means monitoring the signal condition in said third winding to detect the presence of a ground fault on the line conductor;
   C. second means monitoring the signal condition in said third winding to detect the presence of a ground fault on the neutral conductor;
   D. a programmer synchronized to the frequency of the distribution circuit for alternately conditioning said first monitoring means to sample the signal condition in said third winding during a first sampling period and the second monitoring means to sample the signal condition in said third winding during a second sampling period, said programmer further operating to disable said second monitoring means during said first sampling period and to disable said first monitoring means during said second sampling period; and
   E. means responsive to said first monitoring means for initiating circuit interruption in the event fault current flowing through a ground fault on the line conductor exceeds a predetermined current level and responsive to said second means to initiate circuit interruption in the event the neutral conductor is faulted to ground through an impedance below a predetermined impedance level.

7. The device defined in claim 6, wherein said programmer establishes said first and second sampling periods in succession during each cycle of the AC line voltage on the distribution circuit.

8. The device defined in claim 6, which further includes
   A. means connected to said third winding by said programmer during said second sampling period to form a tank circuit, and
   B. a negative resistance network connected to said tank circuit for the duration of said second sampling period, said network operative upon connection to said tank circuit to shock excite said tank circuit and produce a ringing oscillation therein and thereafter to effect regeneration or degeneration of said ringing oscillation depending on the resistive impedance of any ground fault on the neutral conductor reflected into said tank circuit;
      1. said second monitoring means conditioning said responsive means to initiate circuit interruption should the amplitude of said ringing oscillation fail to exceed a predetermined threshold level during said second monitoring period.

9. A ground fault circuit interrupting device for monitoring an electrical circuit including a line conductor and a neutral conductor grounded at the source and selectively interrupting the circuit in the event of ground faults on either conductor, said device comprising, in combination:
   A. a differential current transformer having
      1. a first winding for connection in series with the line conductor,
      2. a second winding for connection in series with the neutral conductor, and
      3. a third winding in which is developed a fault signal proportional in amplitude to any differential in the currents flowing in said first and second windings occasioned by a ground fault on the line conductor;
   B. first means monitoring the amplitude of said fault signal and initiating circuit interruption when said fault signal amplitude exceeds a predetermined threshold level;
   C. second means connected with said third winning to form a tank circuit;
   D. a negative resistance network connected to shock excite said tank circuit and develop therein a ringing oscillation, said network including means for producing either regenerative or degenerative operation of said tank circuit depending on the resistance impedance of any ground fault on the neutral conductor as reflected into said tank circuit via said second transformer winding; and
   E. third means monitoring the amplitude of said ringing oscillation and initiating circuit interruption should the amplitude thereof fail to exceed a predetermined threshold level within a prescribed time period succeeding shock excitation of said tank circuit.

10. The device defined in claim 9, which further includes circuit interrupting means electrically responsive to said first and third means.

11. The device defined in claim 9, which further includes a programmer controlling said first and third means to repetitively monitor said fault signal amplitude during a first sampling period and to monitor said ringing oscillation amplitude during a second sampling period.

12. The device defined in claim 11, wherein said programmer is synchronized with the frequency of the distribution circuit such that said first and second sampling periods are repeated in succession during each cycle of the AC voltage thereon.

13. The device defined in claim 11, wherein said first means includes
   1. a burden resistor connected across said third transformer winding,
   2. a level detector monitoring voltage of said fault signal aas developed across said burden resistor, and
   3. a first switch connected in shunt with said burden resistor, said switch being normally closed to shunt current from said burden resistor,
   4. said programmer operating to open said switch during said first sampling period and divert current through said burden resistor to develop thereacross said fault signal voltage.

14. The device defined in claim 13 wherein said third means includes a second switch controlled by said programmer to connect said negative resistance network to said tank circuit during said second sampling period.

15. The defice defined in claim 11, wherein said third means includes:
   1. a gate connected to pass a trip signal issued by said programmer at the conclusion of said second sampling period to initiate current interruption,
   2. a flip-flop conditioned by said programmer prior to said second sampling period to enable said gate, and
   3. a threshold detector monitoring the amplitude of said ringing oscillation in said tank circuit and conditioning said flip-flop to disable said gate should the oscillation amplitude exceed said predetermined threshold at any time during said second sampling period.

16. The device in claim 15, wherein said third means further includes a second switch controlled by said programmer to connect said negative resistance network to said tank circuit during said second sampling period, and said first means
   1. a burden resistor connected across said third transformer winding,
   2. a level detector monitoring the voltage of said fault signal as developed across said burden resistor, and
   3. a first switch connected in shunt with said burden resistor, said first switch controlled by said programmer to be normally closed to shunt current from said burden resistor and to open during said first sampling period, diverting current through said burden resistor to develop thereacross said fault signal voltage.

17. The device defined in claim 14, which further includes a damping resistor and a third switch conditioned by said programmer during an interval between said first and second sampling periods to connect said resistor in circuit with said third current transformer winding such as to damp any energy therein preparatory to the start of said second sampling period.

18. A ground fault circuit interrupting device for monitoring an electrical circuit including a line conductor and a neutral conductor grounded at the source and selectively interrupting the circuit in the event of ground faults on either conductor, said device comprising, in combination:
   A. a differential current transformer having
      1. a first winding for connection in series with the line conductor,
      2. a second winding for connection in series with the neutral conductor, and
      3. a third winding in which is developed a fault signal proportional in amplitude to any differential in the currents flowing in said first and second windings occasioned by a ground fault on the line conductor;
   B. first, second and third switches;
   C. a burden resistor connected across said first switch;
   D. a capacitor connected across said second switch;
   E. a resistor connected across said capacitor through said third switch;
   F. a negative resistance network connected across said third switch;
   G. a programmer synchronized to the frequency of the distributing circuit and operating to control the condition of said switches, said programmer
      1. maintaining said switches closed to short-circuit said third winding through said first and second switches,
      2. opening said first switch to initiate a first sampling period during which current flow in said third winding is diverted through said burden resistor and to develop thereacross a fault signal voltage.
      3. closing said first switch to conclude said first sampling period and opening said switch to connect said capacitor and resistor in parallel across said third winding to form a tank circuit effective to damp out any current in said third winding,
      4. opening said third switch to initiate a second sampling period, and
      5. closing said second and third switches to conclude said second sampling period;
   H. excitation means operable upon opening of said third switch to shock excite said tank circuit and produce a ringing oscillation therein, said oscillation increasing in amplitude over said second sampling in regenerative fashion at a rate established by said negative resistance network in accordance with the resistive impedance of any ground fault on the neutral conductor as reflected into said tank circuit via said second transformer winding;
   I. first means monitoring the amplitude of said fault signal developed across said burden resistor during said first sampling period and initiating circuit interruption when said fault signal voltage exceeds a first predetermined threshold level;
   J. second means monitoring the amplitude of said ringing oscillation and initiating circuit interruption should the amplitude thereof fail to exceed a second predetermined threshold level during said second sampling period.

19. The device defined in claim 18, wherein said second means includes:
   1. a gate connected to pass a trip signal issued by said programmer at the conclusion of said second sampling period to initiate circuit interruption,
   2. a flip-flop conditioned by said programmer prior to said second sampling period to enable said gate, and
   3. a threshold detector monitoring the amplitude of said ringing oscillation in said tank circuit and conditioning said flip-flop to disable said gate should the oscillation amplitude exceed said predetermined threshold at any time during said second sampling period.

* * * * *